United States Patent
Yang et al.

(10) Patent No.: US 9,037,133 B2
(45) Date of Patent: May 19, 2015

(54) BROADCAST BASED PROXIMITY SERVICE TO MOBILE DEVICE USERS

(71) Applicant: Verizon Patent and Licensing Inc., Basking Ridge, NJ (US)

(72) Inventors: Jin Yang, Orinda, CA (US); Xiaomei Wang, Walnut Creek, CA (US); Priscilla Lau, Fremont, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 127 days.

(21) Appl. No.: 13/728,707

(22) Filed: Dec. 27, 2012

(65) Prior Publication Data

US 2014/0187267 A1 Jul. 3, 2014

(51) Int. Cl.
*H04W 4/02* (2009.01)
*H04W 4/00* (2009.01)
*H04L 29/06* (2006.01)
*H04L 29/08* (2006.01)

(52) U.S. Cl.
CPC ............ *H04W 4/008* (2013.01); *H04L 67/306* (2013.01); *H04L 69/14* (2013.01)

(58) Field of Classification Search
CPC .................................................. H04W 40/204
See application file for complete search history.

(56) References Cited

U.S. PATENT DOCUMENTS

| | | | |
|---|---|---|---|
| 8,358,752 B2 * | 1/2013 | Shaw et al. | 379/88.14 |
| 2001/0018349 A1 * | 8/2001 | Kinnunen et al. | 455/456 |
| 2010/0153216 A1 * | 6/2010 | Liang et al. | 705/14.57 |
| 2011/0105150 A1 | 5/2011 | Moon et al. | |
| 2011/0219226 A1 | 9/2011 | Olsson et al. | |
| 2011/0300832 A1 * | 12/2011 | Shaw | 455/412.1 |
| 2012/0042044 A1 * | 2/2012 | Vishwanathan et al. | 709/217 |
| 2012/0244886 A1 * | 9/2012 | Blom et al. | 455/456.3 |
| 2013/0065580 A1 * | 3/2013 | Hassan et al. | 455/422.1 |
| 2014/0101222 A1 * | 4/2014 | Leppanen et al. | 709/202 |

* cited by examiner

*Primary Examiner* — Vladimir Magloire
*Assistant Examiner* — Frank Donado

(57) ABSTRACT

A message broadcast from a radio frequency transceiver of a cell of a mobile communication network is based on a profile of a proximity service offered to users of mobile devices within the cell coverage area. The message includes information about the proximity service for prompting the users to respond to receive further communication regarding the proximity service. A user operates a mobile device to respond indicating a request to receive further communication regarding the proximity service. In some examples, upon receiving the response, an application server coupled to the network transmits service content as part providing the proximity service to the user. In other examples, if the service profile and a user profile are compatible so as to allow the direct communication, the application server sends instructions to enable direct communication between the mobile device and a proximity service server of the proximity service provider.

19 Claims, 6 Drawing Sheets

BROADCAST BASED PROXIMITY SERVICE TO MOBILE DEVICE USERS

BACKGROUND

In recent years, mobile communication services have expanded and increased in popularity, around the world. Many mobile communication networks offer wireless mobile communication service for voice calls, mobile messaging services (e.g. text and/or multimedia) and data communications. The data services, for example, enable surfing the world wide web, e.g. via a browser. Businesses have utilized these advanced mobile communication services to provide proximity services to mobile devices. In a proximity service, the proximity service provider identifies users of mobile devices that are within proximity of a service point (e.g., a retail location or a content server), and provides services (e.g., notify the address of the retail location or transmit content) to the users within the proximity. These proximity services may take various forms, such as providing promotional offers that the users of the mobile devices may take advantage of that are being offered nearby, or notifying the users that location specific services (e.g., WiFi hotspot service) are available nearby.

A number of different business models have been proposed or developed for providing the proximity services, which have led to several different technical approaches. For example, the user may operate his or her mobile device to execute an application specifically associated with a proximity service provider and provide his or her current location information through the application. In response to the user-provided location information, the proximity service provider provides the proximity services to the user, e.g. by sending information or offers about nearby available services from a server to the mobile device for presentation via the proximity application and the mobile device. This approach requires that the user actively opens the proximity application and provides his or her current location information each time the user moves to a different place. The user may find constantly providing the current location information inconvenient, or may forget to provide the latest location information. In addition, since communication is made between the mobile device and the proximity service provider in a one-to-one basis, the mobile communication networks are used only as a pipeline, and the proximity service providers may not fully utilize the technology and knowledge regarding the mobile devices, that are available from operators of the networks.

Hence, there is still room for further improvement to technology for providing proximity services to mobile devices, so as to provide proximity services that are more convenient to the mobile device users and that takes advantage of the technologies and knowledge regarding the mobile devices available from an operator of the mobile communication network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
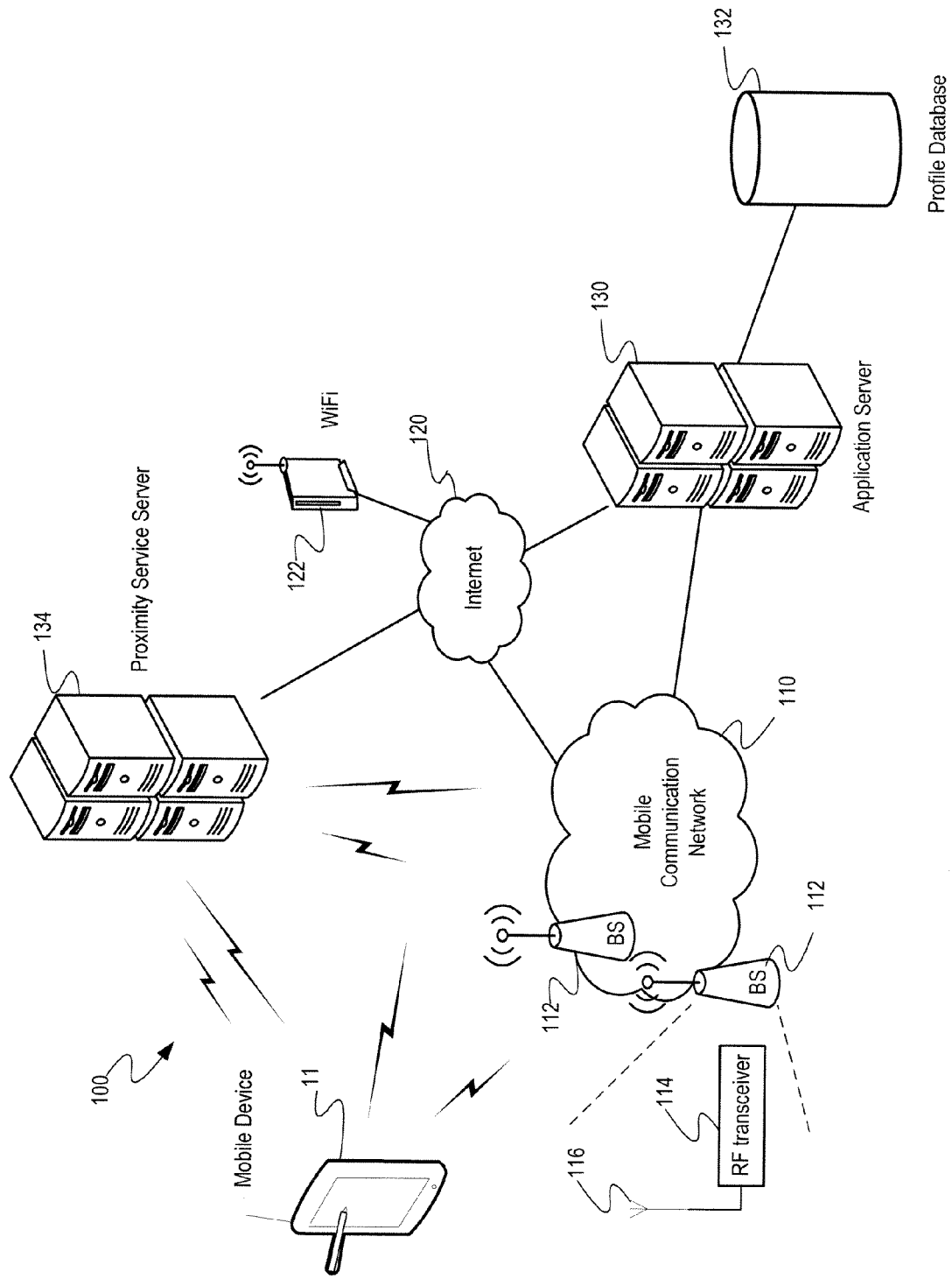
FIG. 1 illustrates a system offering a variety of mobile communication services, including communications for providing a broadcast based proximity service to users of mobile devices.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to technologies for providing a broadcast based proximity service to users of mobile devices. Although an example of broadcasting messages over a mobile communication network is described herein, other methods of transmitting messages to a wide range of users over a mobile communication network may also be used. The technology for broadcasting short messages (e.g., short messaging service messages) to mobile devices within range of base stations of a mobile communication network has been developed, for example, for making announcements to mobile devices that are within a geographic area affected with an emergency situation (e.g., natural disasters or crimes). An application server may be provided which utilizes this broadcasting technology to broadcast short messages via the mobile communication network in relation to providing proximity services to mobile device users. The short messages prompt users of mobile devices to respond in order to receive further communication regarding a service provided by a proximity service provider. The proximity service provider may be the carrier of the mobile communication network, or a third party. The short message also includes a description of service content that will be provided to the user. The messages may be broadcast based on a service profile provided by the proximity service provider. For example, the proximity service provider may indicate in the service profile the geographic region to which to broadcast the short messages, and the content of the messages. Based on such service profile, the application server may transmit the short messages for broadcasting to the mobile device users, for example, via one or more cell site transceivers having area of coverage corresponding to a geographic area of the provided service.

All mobile devices within the coverage area of the cell site transceivers may receive the broadcast message. However, the mobile devices may be configured based on user input or user profiles such that, among the received broadcast messages, only those messages that fall under user-selected categories are displayed to the user. The broadcast short messages may contain the category and one or more keywords associated with the message such that the mobile device may determine whether or not the received broadcast messages fall under the user-selected categories. A user of the mobile device which has received and displayed the broadcast short message may respond to the broadcast message, for example, to cause the user's mobile device to send a request to receive further communication regarding a proximity service. Upon receiving such a request, the application server may transmit service content of the requested proximity service associated with the broadcast short message to the user. At such a point in this example, the service content is directed specifically to the requesting user, rather than being broadcast to the users in the geographic area. The service content may include, for example, a location of a store, promotional offers such as coupons, multimedia content such as video and music, or applications that the user may install at his or her mobile device. In one example, in addition to transmitting the service content of the requested proximity service, service content of another proximity service that is not associated with the broadcast short message, may also be transmitted to the user, based on a user profile. For example, the broadcast message may prompt the user to respond and receive a coupon for a nearby coffee shop (e.g., one within a relatively small distance from the mobile device location, such as a ¼-½ mile). After the user responds to the broadcast message to request the coupon, a determination may be made that, based on the user profile, the user has just bought a new smartphone. Based on such a determination, in addition to receiving the coupon, the use may also receive information on the location of retail stores selling smartphone accessories.

In addition to or alternatively, the application server may also determine whether to offload the transmission of the service content from the mobile communication network. Offloading the transmission of the service content may reduce the load on the mobile communication network, especially if the size of the transmitted service content is large (e.g., high-definition video). Determination to offload the transmission may be based on the service profile and the user profile. The service profile and the user profile may each include information for determining whether the proximity service server of the proximity service provider and the user's mobile device are compatible so as to allow direct communication between each other. If determination is made to offload the transmission of the service content from the mobile communication network, the application server initiates direct transmission of the service content from the proximity service server of the proximity service provider to the user's mobile device, for example by sending instructions to the one mobile device to set-up direct communication with the server of the service provider via an alternate communication network.

Reference is now made in detail to the examples illustrated in the accompanying drawings and discussed below. FIG. 1 illustrates a system 100 offering a variety of mobile communication services, including communications for providing broadcast based proximity service to users of mobile devices. The example shows simply one mobile device 11 as well as a mobile communication network 110. The mobile device 11 is a smart phone type device, in this case that utilizes a touch screen for the user interface. The network 110 provides mobile wireless communications services to mobile devices including device 11, for example, via a number of base stations (BSs) 112 of the network 110. In such an example, each of the base stations 112 has or connects to a radio frequency transceiver 114 that provides radio signal coverage for a cell of the network 110 via an antenna 116. The transceiver 114 of each base station 112 may be connected to a power supply (not separately shown) and other control circuit (not separately shown) for providing communicating with the rest of the network 110. While the drawing shows one radio frequency transceiver 114 connected to an antenna 116, each of the base stations 112 may have or connect to multiple transceivers. The present techniques may be implemented in any of a variety of available mobile networks 110 and/or on any type of mobile device compatible with such a network 110, and the drawing shows only a very simplified example of a few relevant elements of the network 110 for purposes of discussion here. Although only the one user's device 11 is shown, the network 110 may provide various communications for many other similar users and their various devices as well as for mobile devices/users that do not participate in the communications related to the broadcast based proximity service under consideration here.

The mobile communication network 110 may be implemented as a network conforming to any of the applicable standards for public mobile wireless communications, examples of which include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In a 4G implementation, the base stations 112 may be implemented as Evolved Node B (eNodeB).

Many of the mobile devices served by network 110, including device 11 in our example, are capable of voice telephone communications through the network 110, various types of mobile messaging service communication and mobile data communications. The exemplary device 11 will typically utilize the messaging service transport and data communications through the particular type of network 110 for the communications related to providing broadcast based proximity service to the user of the device 11; and the user of the device 11 typically will have subscribed to messaging and data service through the network 110.

In general, the network 110 offers users of the mobile devices such as device 11 (and other mobile devices not shown) IP data transport for a variety of data services, e.g. via the Internet 120, such as downloads, web browsing, email, etc. Such communications may be with other mobile devices, various other types of user terminals and/or computers configured as servers. The network 110 also offers the messaging service transport for a variety of messaging services, e.g., such as broadcasting emergency messages to mobile devices within an area affected by an emergency situation, and sending messages from a mobile device to another mobile device. Such messages may be sent, e.g., in a short messaging service (SMS) format.

In this example, system 100 also includes an application server 130, a profile database 132, and a proximity service server 134. The application server 130 communicates with the mobile device 11, through the network 110 and/or the Internet 120, for providing broadcast based proximity services to the mobile device 11. Although the application server 130 may be managed by a third party, in our example, the carrier providing the mobile communications services to the mobile device 11 through the network 110 may also operate and manage the application server 130. In an IP Multimedia System (IMS) based implementation of the carrier's network, the server 130 may be an application server within the IMS portion of the core network.

For providing broadcast based proximity services, the drawing shows that application server 130 is connected with an exemplary profile database 132, which is also managed by the carrier providing the mobile communications services to the mobile device 11. The database 132 may reside on an appropriate storage device within the computer or system that implements the server 130, on a separate storage device locally coupled to the computer or system that implements the server 130, or on somewhat separate and/or remote storage device accessible by the application server 130.

The drawing also shows that the application server 130 is in communication with the proximity service server 134, via the network 110 and/or the Internet 120. The proximity service server 134 may be managed by the proximity service provider and transmit service content to the mobile device 11, as part of providing the broadcast based proximity service.

As noted, the database 132 is a profile database. An example of a profile database is a Proximity Service (at times called "ProSe") database, which may include user profiles for users who have subscribed to the mobile communication services provided by the carrier operating the network 110. In our example, the database 132 may further include service profiles defined by proximity service providers who are providing the proximity services through the network 110. The database 132 may also include service content for transmitting to the mobile devices as part of providing the broadcast based proximity service.

Types of information that may be included in the user profiles are, for example, user preferences for filtering categories of broadcast messages that the user does not wish to receive at his or her mobile device, information on whether the user's mobile device supports direct communication with another device (e.g., another mobile device or a proximity service server providing service content) via an alternate network so as to offload transmission of the service content from the mobile network 110, the mobile device capability (e.g., size of display, supported data speed, buffer and storage capacities), and credential information with respect to receiving proximity services from the proximity service provider such as subscriptions and/or payment information for the proximity services. The service profile may include for example, the type of proximity service provided (e.g., streaming multimedia content such as video and music, providing location of a store, providing coupons or other special offers, data storage services), geographic area to which messages prompting the mobile device users to respond for receiving further communications are to be broadcast, whether service content is available for direct transmission at the proximity service server 134 and/or is available at the profile database 132 for transmission via the network 110, information on whether the proximity service server 134 supports direct communication to the mobile devices so as to offload transmission of the service content from the network 110, and information on technical specifications related to offloading the service content transmission (e.g., supported bandwidth for offloading or supported type of offload technology).

Based on the service profile obtained from the profile database 132, the application server 130 may initiate broadcasting of short messages to mobile devices (e.g., device 11) that are within cells of a geographic area identified by the service profile, via the base stations 112 of the network 110 that correspond to the cells. In this example, the short messages take the form of a Short Messaging Service (SMS). In many existing network architectures, SMS traffic uses the signaling portion of the network, such as the paging channel over the airlink between a base station (e.g., base station 112) and a mobile device (e.g. mobile device 11). A regular SMS message sent from one end to another end usually has a predetermined maximum allowed message length (e.g., about 140-160 characters). A regular SMS message also includes source and destination address fields. For messages originated from a mobile device, the source address is typically the mobile directory number (MDN) of the sender's mobile device. The destination address may be a MDN of a destination mobile device or some other form of recognizable address. When a regular SMS message is sent to a particular mobile, the SMS message is routed to the base station of the cell in which the destination mobile device is located, for transmission via the base station. The mobile devices within the coverage area of the cell will receive the transmitted SMS message, and if the destination address of the SMS message matches the MDN of the receiving mobile device, the SMS message will then be displayed to the user of the mobile device. Otherwise, the SMS message may be ignored by the mobile device.

Technologies for broadcasting such SMS messages, for example, to deliver emergency messages to areas affected by emergency situations, are also available in many of the existing network architectures today. A broadcast SMS message may have a shorter message length and carry a teleservice ID indicating that this is a broadcast SMS message intended for all mobiles. All mobiles within the targeted area may receive and accept the broadcast SMS messages without a matched MDN in the destination address field in the SMS message. Some mobile devices 11 may implement local functionality on the device to determine whether to display the received broadcast SMS message to the user, while other mobile devices 11 may display the received SMS message without screening.

When short messages are broadcast to the mobile devices for proximity services, the address of the application server 130; such as a short code. IP address, or email address may be included in the source address field of the SMS message, such that replies may be directed to the application server 130. The destination address field of the short SMS message may contain the category, language and priority of the message and/or other relevant information to allow the receiving mobile device 11 to decide whether to display or ignore the received message to the user.

When the short message is broadcast to provide broadcast-based proximity service, technologies and network resources for broadcasting emergency SMS messages may be leveraged as one example. In this example, the application server 130 may submit the short message to be broadcast together with the targeted area identified by longitude and latitude, zip code, city or county name, or other method, to a network broadcast messaging center (not shown in FIG. 1) which is typically managed by the same carrier providing the mobile communications services to the mobile device 11 to support broadcasting emergency SMS messages. The broadcast messaging center may then map the targeted area into a list of appropriate base stations or cells and deliver the short message to these base stations/cells so that the said short message may be broadcast. Category Code or other type of data may be included in the short message, such that all mobile devices within the coverage area of the cells/base stations may recognize the transmitted short message as being intended for each mobile station within the coverage area. Furthermore, when broadcasting of short messages for providing a broadcast based proximity service and broadcasting of emergency SMS messages share the same physical and/or logical resources (e.g., application server 130 or base stations 112), broadcasting of the emergency SMS messages may be assigned a higher priority by the broadcast messaging center. As an example, broadcasting for providing broadcast-based proximity service may be inhibited for a geographic area where there is outstanding emergency SMS message to be broadcast.

The application server 130 may further receive a response to the broadcast short message from a mobile device (e.g., device 11) requesting further communications regarding a broadcast based proximity service, provide the requested service content stored in profile database 132 to mobile device 11 via the network 110, and/or initiate an offloaded direct transmission between proximity service server 134 and mobile device 11 based on compatibility analysis of the pre-stored user profile and the service profile in profile database 132. For example, if the service profile indicates that the service content is relative short (e.g., location information of a nearby retail store) and is available at the profile database 132, the application server 130 may send such information to the requesting mobile device 11 via the network 110. If the service profile indicates that the service content contains a large amount of data (e.g., a video stream) and is only available for direct transmission at the proximity service server 134, the application server 130 may determine if offloaded direct transmission of the service content is possible based on the user profile of the requesting mobile device 11 and the service profile of the proximity service server. If the user profile and the service profile are compatible for offloaded transmission from the proximity service server 134 to the user's mobile device 11, the application server 130 may initiate the offloaded transmission. If the profiles are incompatible, a notification may be sent to the mobile device 11 indicating that the requested service content is not available. Offloaded direct transmission between the proximity service server 130 and the mobile devices 11 may use various alternative wireless networks and technologies, such as WiFi Direct, Bluetooth, etc.

The proximity service server 134 for providing the service content to the mobile devices is also connected to the application server 130. The proximity service server 134 may be connected to the application server 130 via the mobile communication network 110 and/or the Internet 120. When the application server 130 determines to offload the transmission of service content from the network 110, the application server 130 communicates with the proximity service server 134 and the mobile device 11 to initiate the direct transmission of the service content, either via the network 110 or the Internet 120.

To insure that the communication between the mobile devices and the application server 130 for providing broadcast based proximity service is available on a virtually continuous uninterrupted basis for many similar users/devices, each of the application server 130, the profile database 132, and the proximity service server 134 are typically implemented on many similar platforms on a distributed basis.

The mobile device 11 may be capable of WiFi communication as well as or instead of mobile wireless communication via a network like the illustrated network 110. Hence, for discussion purposes, the drawing also shows a WiFi access point 122 connected to the Internet 120.

The WiFi access point 122 may be a hotspot in a public or commercial venue, which provides Internet access within the vicinity; or the WiFi access point 122 may be secured to provide private access in a home, an office, on a campus, or the like. The access point 122 provides WiFi enabled devices like mobile device 11 with wireless IP packet data communication, in this case, for access to the Internet 120. When available, communications providing broadcast based proximity services with the application server 130 may utilize WiFi instead of wireless mobile communications through the network 110.

Figure 2:
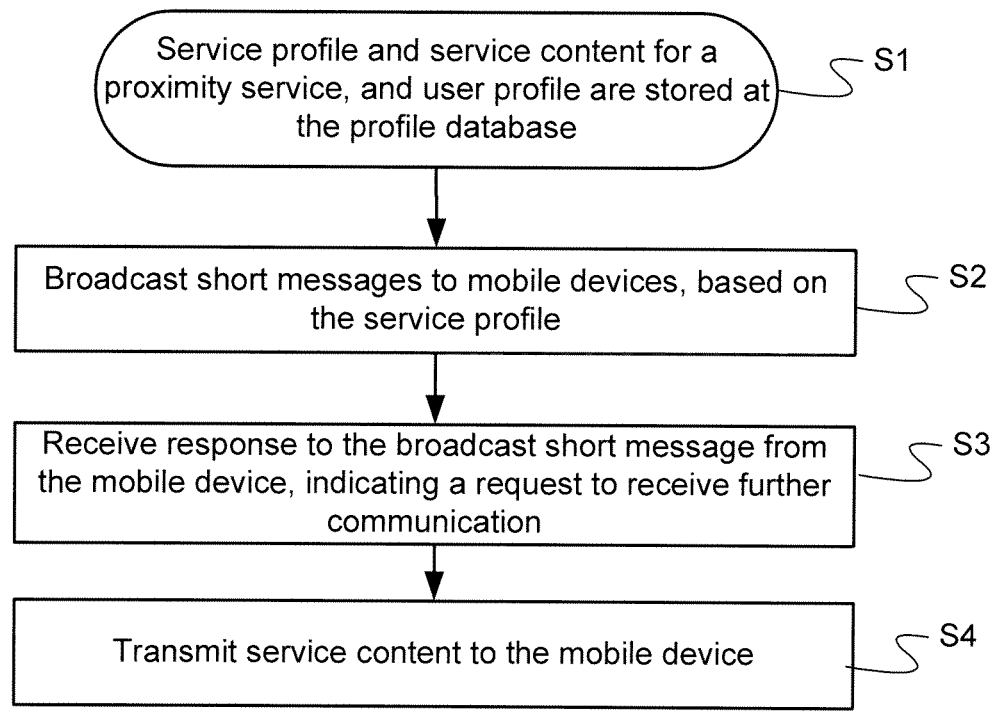
FIG. 2 is a flow chart useful in understanding a process for providing a broadcast based proximity service to a mobile device user.

FIG. 2 is a flow chart useful in understanding a process for providing a broadcast based proximity service to a mobile device user. For the discussion of the process flow of FIG. 2, we will assume that service profile of a proximity service, the service content for the proximity service and the user profile of the user of the mobile device 11 are stored in the profile database 132 (step S1). In step S2, the application server 130 broadcasts short messages to mobile devices based on a service profile for a proximity service, via the network 110. In this example, the broadcast short message prompts the users to respond in order to receive further communications regarding the proximity service. The broadcast short message also includes a short description regarding the proximity service, and the type of information that the user will receive if the user responds to the short message to request further communication. For example, the proximity service may be a service notifying the users of retail locations that are within the proximity of the users and provide any promotional offers for the retail locations; and the broadcast short message may be a short messaging service (SMS) text message which reads "There is a coffee shop available nearby. Please reply 'YES' if you wish to receive the address of this coffee shop and a 10% discount coupon!" The service profile also includes a geographic location to which the short messages are to be broadcast. The application server 130 transmits the short messages such that the messages are broadcast from base stations of cells that are within the geographic locations indicated in the service profile. Therefore, only the mobile devices that are within the coverage area of such cells may receive the broadcast short message.

A mobile device, such as the device 11, may receive such a broadcast short message, and display the short message to the user. The received short message may be treated as a regular SMS message that is received at the mobile device 11. For example, upon receiving the broadcast short message, the mobile device may notify the user that the message has been received, and provide a user interface through which the user may access the full message. The mobile device 11 may also be configured to filter the received broadcast messages such that only those messages falling under predetermined user-selected categories are made available to the user. For example, a message header including the category, language, priority and message identifier associated with the message may be included in the broadcast message, and the mobile device 11 may filter the received messages based on these attributes. Assuming that the received short message is the SMS message in the example above, the user may respond to the message by replying to the received message with a predetermined message, e.g., the word "YES," as a request for further communication regarding the proximity service, in the above example, to receive the address of the coffee shop and the 10% discount coupon. The broadcast message may include a reply-to address (e.g., a short code, an IP address, or an email address) such that the response by the user indicating a request to receive further communication may correctly received by the application server 130 (step S3).

Upon receiving the user's response indicating a request to receive further communication, the application server 130 transmits service content to the user of the mobile device 11 (step S4). In the above example, the service content is the address of the coffee shop and the 10% discount coupon, and may be obtained from the profile database 132. As opposed to the short message prompting users to respond in order to receive further communication, which was broadcast to all users within the geographic area specified by the service profile, the service content is addressed specifically to a user who has responded to the message, in this example the user of the mobile device 11. In addition to transmitting the requested service content, the application server 130 may also determine additional service content that the user may also be interested in, based on the user profile stored in the database 132. In the example above where the service content is the address of the coffee shop and the 10% discount coupon, in addition to transmitting the address and the coupon to the user, the application server 130 may also determine based on the user profile that the user has recently switch to a new smartphone. Therefore, the application server 130 may also transmit the address of a nearby retail location that sells smartphone accessories. The transmission of the service content may be made via various media such as, for example, a regular SMS message sent to the mobile device 11, or an email sent to an email address associated with the user of the mobile device 11. In this example, the service content may be transmitted via the network 110.

Figure 3:
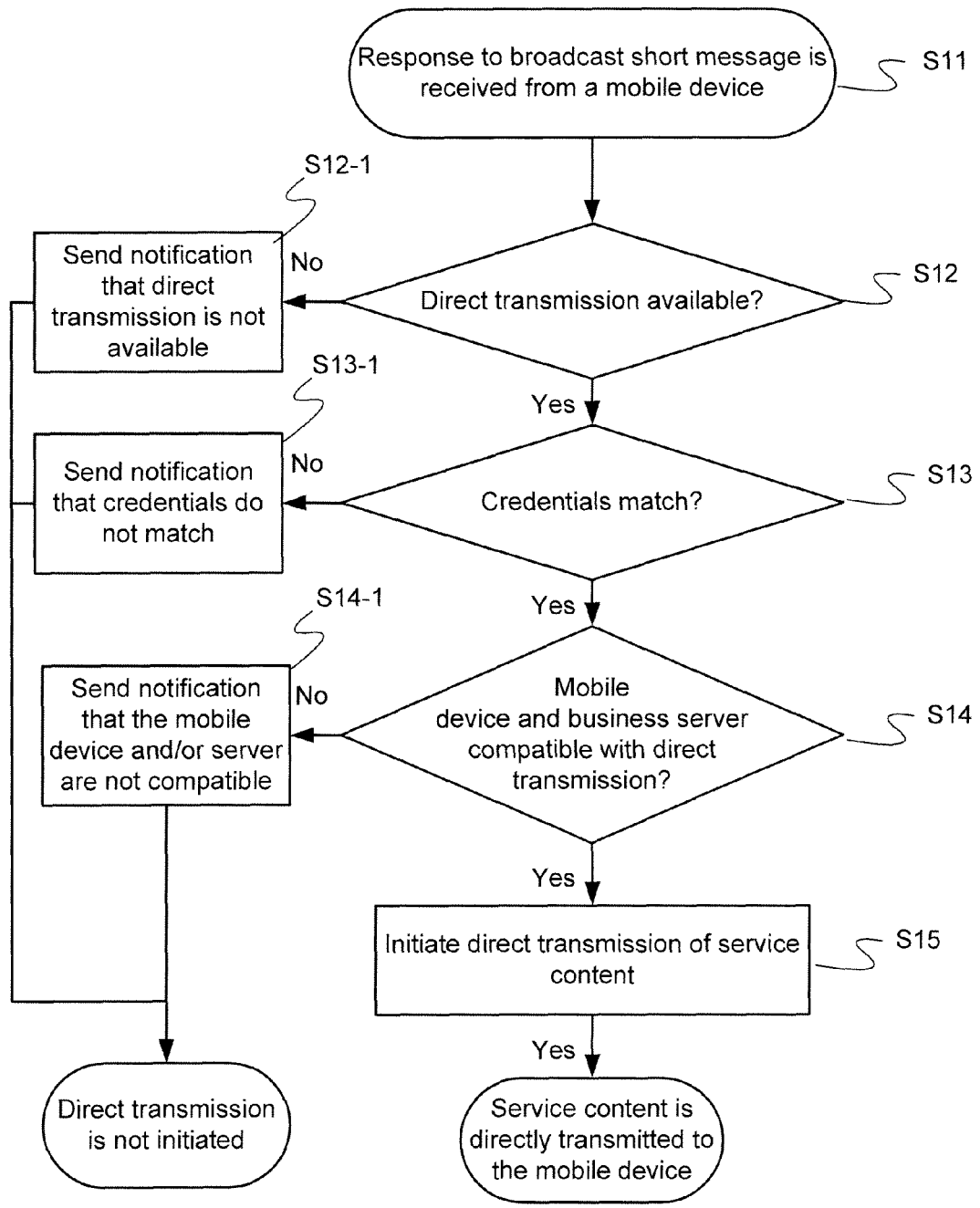
FIG. 3 is a flow chart useful in understanding a process for providing a broadcast based proximity service to a mobile device user, which may involve offloading transmission of at least some service content from a mobile communication network.

In another example, the transmitted service content may include a large amount of data, such as a high-definition video stream, a high quality music file, or an application which the user may download and install at the mobile device 11. In this case, either the proximity service provider or the user may not prefer transmitting the service content through the network 110. The carrier of the network 110 may also prefer to offload such service content transmission in order to reduce the network load. In such cases, service content may be stored at the proximity service server 134 of the proximity service provider, and be transmitted directly to the mobile device 11 from the proximity service server 134, without going through the network 110. By directly transmitting service content form the proximity service server 134 to the mobile device 11, the user of the mobile device 11 and/or the proximity service provider may avoid incurring data transmission charges for transmitting data over the network 110. FIG. 3 is a flow chart useful in understanding a process for providing a broadcast based proximity service to a mobile device user by offloading transmission of service content from the network 110. For the discussion of the process flow of FIG. 3, we will assume that the application server 130 has received a response, from the user of the mobile device 11, to a broadcast short message prompting the user to respond in order to receive further communication regarding a proximity service provided by the proximity service provider (step S11).

At step S12, the application server 130 determines whether direct transmission of service content is part of providing further communication regarding the proximity service, so as to offload the transmission from the network 110, is available. Such determination may be made based on the service profile for the proximity service. As discussed above, the service profile may include information on whether service content is available for direct transmission from the proximity service server 134, whether the proximity service server 134 for transmitting service content to the mobile devices supports direct communication to the mobile devices so as to offload transmission of the service content from the network 110, and information on technical specifications related to the direct transmission of the service content (e.g., supported bandwidth for direct transmission or supported type of direct transmission technology, such as Bluetooth or WiFi Direct).

If the service profile indicates that direct transmission is not available, direct transmission is not initiated and the application server 130 may send a notice to the mobile device 11, through the network 110 (step S12-1). The notice may indicate that direct transmission for the service content is not available, and also include pieces of service content that may be sent through the network 110. In the example above in which the service content is an address of a coffee shop and a 10% discount coupon, the service profile may indicate that direct transmission is not available, but that the address of the coffee shop and the 10% discount coupon is stored in the profile database 132 and may be transmitted via the network 110. In such case, the application server 130 may send a notification to the mobile device 11 notifying the user that direct transmission of service content is not available, but include the address for the coffee shop and the 10% discount coupon in the notification. The notification may be sent via various media such as, for example, as a regular SMS message directed to the mobile device 11 or as an email sent to an email address associated with the user of the mobile device 11.

If the service profile indicates that direct transmission is available for the service content, then the application server 130 may also determine whether the credentials for the user profile and the service profile match (step S13). The service profile may include information for verifying the credential of users who are authorized to receive service content from the proximity service server 134. Such authorized users may be, for example, users who have provided payment to the proximity service provider in return for receiving service content, or users who are willing to provide payment to the proximity service provider. The user profile may include the credentials such as ID, password and/or payment information, and the application server 130 may compare such credentials with the information stored in the service profile to determine whether the credentials match.

If the credentials do not match, the application server 130 may send a notification to the user indicating that the credentials do not match (step S13-1), and direct transmission will not be initiated. The notification may be sent via various media such as, for example, as a regular SMS message directed to the mobile device 11 or as an email sent to an email address associated with the user of the mobile device 11.

If the credentials match, the application server 130 may further determine whether the mobile device 11 and the proximity service server 134 are compatible with direct transmission of the service content (step S14). Such a determination may be made based on the user profile and the service profile. For example, as discussed above, the user profile may contain information on whether the mobile device 11 supports a technology for directly communicating with another device or server, the types of supported technology (e.g., Bluetooth or WiFi Direct), and the supported bandwidth for the direct communication. The service profile may also contain information on whether the proximity service server 134 supports a technology for directly communicating with a mobile device, the types of supported technology (e.g., Bluetooth or WiFi Direct), and the supported bandwidth for the direct communication.

If based on the user profile and the server profile, determination is made that the mobile device 11 and the proximity service server 134 are incompatible for direct transmission of service content, the application server 130 may send a notification to the mobile device 11 indicating that the mobile device 11 and the proximity service server 134 are not compatible for direct transmission of the requested service content (step S14-1). The notice may also include information on alternative source for obtaining the service content. For example, if the service content is a video stream, the notice may include the address of a retail location where a DVD of the video stream may be purchased. The notification may be sent via various media such as, for example, as a regular SMS message directed to the requesting mobile device 11 or as an email sent to an email address associated with the user of the requesting mobile device 11.

If determination is made that the mobile device 11 and the proximity service server 134 are compatible for direct transmission of the service content, the application server may initiate the direct transmission (step S15). For example, if determination is made that both the mobile device 11 and the proximity service server 134 support direct transmission over WiFi Direct network, the application server 130 may send instructions to the mobile device 11 and/or the proximity service server 134 so as to establish a connection over a WiFi Direct network and begin transmitting the service content from the proximity service server 134 to the mobile device 11.

In an example, even if determination is made that the mobile device 11 and the proximity service server 134 are incompatible for direct transmission, the user profile and the service profile may indicate to proceed with transmitting the service content through the network 110. In such case, the application server 130 may initiate transmission of the service content to the mobile device through the network 110.

Figure 4:
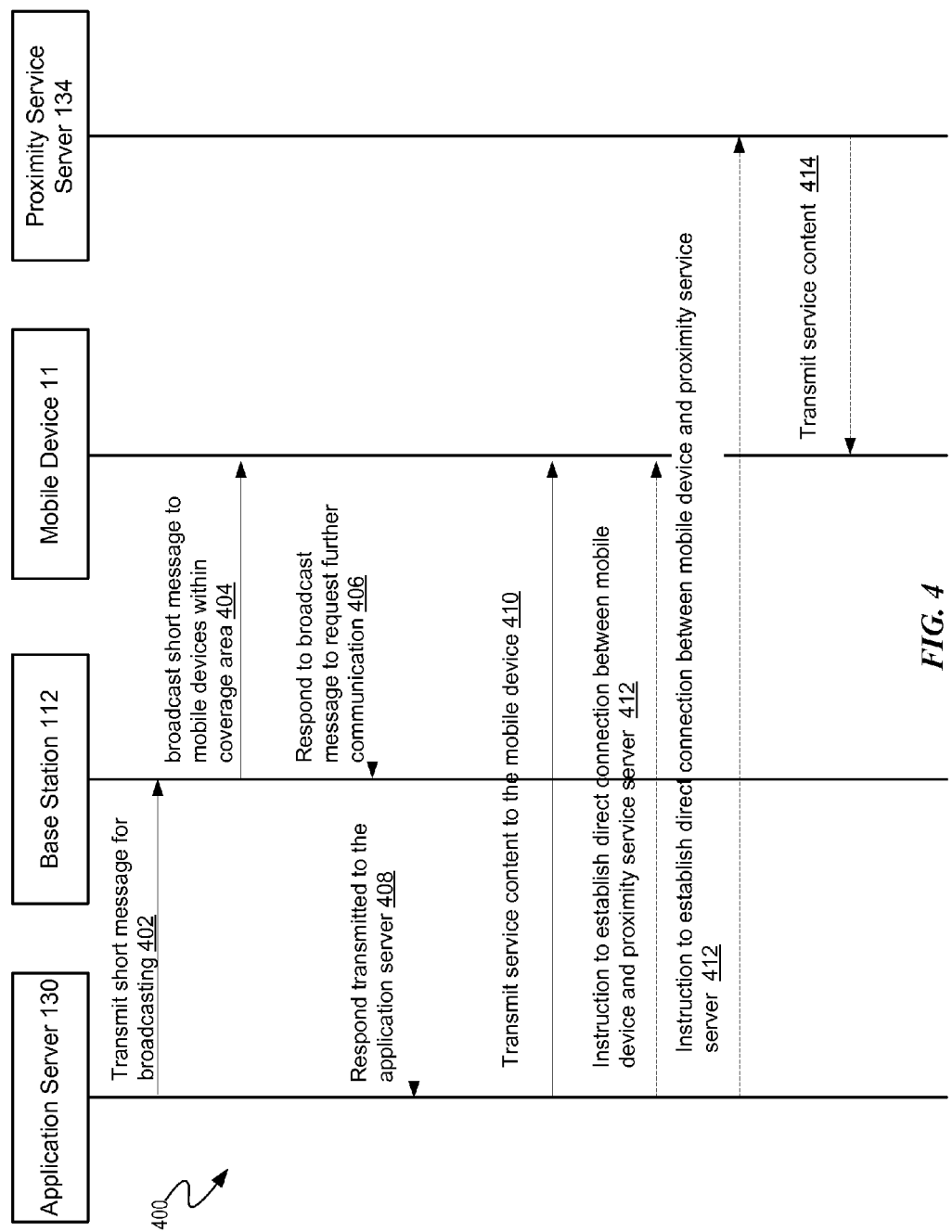
FIG. 4 is a signal diagram useful in understanding dataflow for providing a broadcast based proximity service to a mobile device user.

FIG. 4 is a signal diagram 400 useful in understanding dataflow for providing a broadcast based proximity service to a mobile device user. At step 402, short messages prompting a user of a mobile device to respond in order to receive further communication regarding a proximity service is transmitted to base stations 112 having area of coverage corresponding to a geographic area for the provided proximity service. At step 404, the short messages are then broadcast to the mobile devices within the coverage area of the base stations. At step 406, if a user responds to the broadcast message as a request to receive further communication regarding the proximity service, the response is transmitted back to the base station 112. At step 408 the response is transmitted back to the application server 130. Upon receiving the response requesting further communication regarding the proximity service, at step 410, the application server 130 may transmit service content for the requested proximity service directly to the mobile device 11. The service content may be transmitted via the base station 112 in network 110, or via other communication channels, such as WiFi access point 122.

Alternative to step 410, in an example, the application server 130 may instruct both the proximity service server 134 and the mobile device 11 to establish a direct communication for transmitting service content from the proximity service server to the mobile device (step 412). After the direct communication is established between the proximity service server 134 and the mobile device 11, the service content for the request proximity service may be transmitted directly from the proximity service server 134 to the mobile device 11 (step 414).

Figure 5:
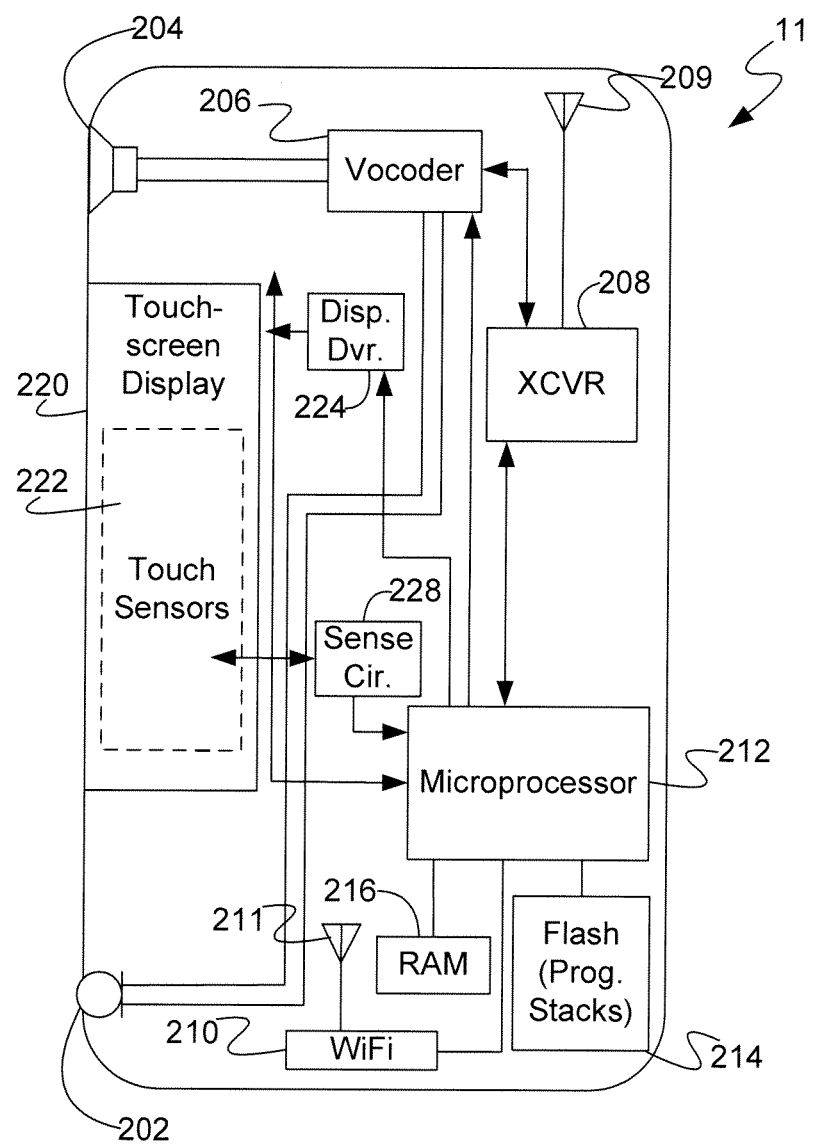
FIG. 5 is a block diagram illustration of an exemplary mobile device.

It may be useful next to consider the functional elements/aspects of an example of a mobile device 11, at a high-level, with regard to FIG. 5. FIG. 5 illustrates elements of the mobile device 11 in functional block diagram form, at a relatively high level.

It should be appreciated that the disclosed subject matter may be implemented using any mobile computing device having computing capability and mobile communication capability, configured to use those capabilities to conduct operations such as, for example, providing proximity service to the mobile device 11, as discussed herein. In the example of FIG. 5, the mobile device 11 is in the form of a smart phone type mobile handset including a touch screen display. Examples of touch screen type mobile devices that may be used to implement mobile device 11 may include, but are not limited to, a smart phone, personal digital assistant (PDA), tablet computer or other portable device with mobile communication capability. However, the structure and operation of the touch screen type mobile device 11 is provided by way of example; and the subject technology as described herein is not intended to be limited thereto. For purposes of this discussion, FIG. 5 provides a block diagram illustration of the exemplary mobile device 11 having a touch screen display for displaying content and receiving user input as or as part of the user interface.

Although the operations that are the focus of discussions here utilizes data communications, a typical mobile device such as the exemplary smart phone 11, may also support voice communications. Hence, in the example shown in FIG. 5, mobile device 11 includes a microphone 202 for audio signal input and a speaker 204 for audio signal output. The microphone 202 and speaker 204 are communicatively coupled to a voice or audio encoder/decoder (vocoder) 206. For a voice telephone call, for example, the vocoder 206 provides two-way conversion between analog audio signals representing speech or other audio and digital samples at a compressed bit rate compatible with the digital protocol of wireless telephone network communications or voice over packet (Internet Protocol) communications. The vocoder, speaker and microphone may also be used as elements of the user interface during other operations of the device, including some types of data communications.

Also, as shown in FIG. 5, the mobile device 11 includes at least one digital transceiver (XCVR) 208, for digital wireless communications via a wide area wireless mobile communication network, although the mobile device 11 may include additional digital or analog transceivers (not shown). The transceiver 208 conforms to one or more of the various digital wireless communication standards utilized by modern mobile networks. Examples of such transceivers include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G," In an example, transceiver 208 provides two-way wireless communication of information including, digitized audio signals, still image and/or video signals, web page information for display as well as web related inputs, and various types of mobile message communications to/from the device.

Several of these types of communications through the transceiver and a network, as discussed above, will relate to providing broadcast based proximity services to the mobile device 11, for example, in an implementation in which service content is transmitted to the mobile device 11 upon receiving a response to a broadcast short message prompting the user of the mobile device 11 to respond in order to receive further communication regarding a proximity service. Communications related to providing broadcast based proximity service, for example, will often utilize Internet Protocol (IP) packet data transport utilizing the digital wireless transceiver (XCVR) 208 and over the air communications to and from base stations of the serving mobile network. Such communications may include specific mobile device application related data as may include related text, image, video and/or audio information.

Transceiver 208 also sends and receives a variety of signaling messages in support of various voice and data services provided by a network of a wireless service provider, to a user of mobile device 11 via the mobile communication network. Transceiver 208 connects through radio frequency (RF) send-and-receive amplifiers (not separately shown) to an antenna 209. Transceiver 208 may also support various types of mobile messaging services, such as short message service (SMS), enhanced messaging service (EMS) and/or multimedia messaging service (MMS). Although data communications involving mobile device application related data typically utilize IP data transport, such data communications may at times utilize one or more of these mobile messaging services for the data transport through the mobile communication network, for example when broadcasting short messages to the mobile devices, including the mobile device 11.

Many modern mobile devices also support wireless local area network communications over WiFi, instead of or in addition to data communications using the wide area mobile communication network. Hence, in the example of FIG. 5, for packet data communications, the exemplary device 11 also includes a WiFi transceiver 210 and associated antenna 211. Although WiFi is used here as the example, the transceiver 210 may take the form of any available two-way wireless local area network transceiver of a type that is compatible with one or more standard protocols of communication implemented in wireless local area networks, such as one of the WiFi standards under IEEE 802.11 and/or WiMAX. The transceiver 210, for example, may provide two-way data transport for wireless communication with a wireless access point in a residence or enterprise that the user frequents or with any available hotspot offered in a public venue. Although communicating through a different network or networks, the transceiver 210 supports various types of data communications similar to the packet data communications supported via the mobile network transceiver 208, including communications that may relate to providing broadcast based proximity service to the mobile device 11.

WiFi, as in the illustrated example, has been widely adopted for wireless local area network communications, e.g. currently over distances of up to about 100 meters or so. Although this range is somewhat shorter than that available from mobile networks via the transceiver 208, the wireless local area network communications typically incur no or lower data usage charges than the communications via the transceiver 208 using the mobile network.

Mobile device 11 further includes a microprocessor (or "processor") 212, which serves as a programmable controller for mobile device 11 by configuring mobile device 11 to perform various operations, for example, in accordance with instructions or programming executable by processor 212. Such operations may include, for example, various general operations of mobile device 210 as well as operations implemented by execution of various applications that have been installed on the mobile device 11. For purposes of the present discussion, the mobile device operations implemented by processor execution of appropriate programming also include operations related to providing broadcast based proximity service to the mobile device 11, and related operations as described herein.

A flash memory 214 is used to store, for example, programming or instructions, for execution by the processor 212. Depending on the type of device, the mobile device 11 will store and run an operating system through which the mobile device applications may be run on the device. Examples of operating systems include Android, Apple iOS (I-Phone or iPad devices), Windows Mobile, RIM BlackBerry operating system, or the like. The programming in the flash memory 214 will also include one or more application programs configured for execution on the processor 212 via or in cooperation with the specific operating system. Flash memory 214 may also be used to store mobile configuration settings for different mobile device applications or services executable at mobile device 11 (using processor 212). Mobile device 11 may also include a non-volatile random access memory (RAM) 216 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Program aspects of the technology may be thought of as "products" or "articles of manufacture" typically in the form of executable code or process instructions and/or associated data, that is stored on or embodied in a type of machine or processor readable medium.

A mobile device under consideration here may include a variety of different types of user interface elements. For discussion purposes, in the smart phone example shown in FIG. 5, the user interface elements of mobile device 11 include a touch screen display 220 (also referred to herein as "touch screen 220" or "display 220"). For output purposes, the touch screen 220 will include a display screen, such as a liquid crystal display (LCD) or the like. For input purposes, touch screen display 220 includes a plurality of touch sensors 222. Other interface elements may include a keypad including one or more keys 230. For example, the keypad may be implemented in hardware as a T9 or QWERTY keyboard of mobile device 11 and keys 230 may correspond to the physical keys of such a keyboard. Alternatively, keys 230 (and keyboard) of mobile device 11 may be implemented as "soft keys" of a virtual keyboard graphically represented in an appropriate arrangement via touch screen display 220. The soft keys presented on the touch screen display 220 may allow the user of mobile device 11 to invoke the same user interface functions as with the physical hardware keys. In some implementations, the microphone 202 and speaker 204 may be used as additional user interface elements, for audio input and output, including with respect to some functions related to providing broadcast based proximity service to the mobile device 11, as described herein.

For output, touch screen display 220 is used to present information (e.g., text, video, graphics or other visible content) to the user of mobile device 11. Processor 212 controls visible display output on the LCD or other display element of the touch screen display 220 via a display driver 224, to present the various visible outputs to the device user. For example, the programming may cause the processor 212 to operate the driver 224 to cause screen 220 to display a broadcast short message received at the mobile device 11, or provide a user interface for allowing the user to reply to the short message.

In general, touch screen display 220 and touch sensors 222 (and one or more keys 230, if included) are used to provide the textual and graphical user interface for the mobile device 11. In an example, touch screen display 220 provides viewable content to the user at mobile device 11. Touch screen display 220 also enables the user to interact directly with the viewable content provided in the content display area, typically by touching the surface of the screen with a finger or an implement such as a stylus.

As shown in FIG. 5, mobile device 11 also includes a sense circuit 228 coupled to touch sensors 222 for detecting the occurrence and relative location/position of each touch with respect to a content display area of touch screen display 220. In this example, sense circuit 228 is configured to provide processor 212 with touch-position information based on user input received via touch sensors 222. In some implementations, processor 212 is configured to correlate the touch position information to specific content being displayed within the content display area on touch screen display 220. The information tracked by sense circuit 228 is used by processor 212 to detect various points of touching as well as different types of touch gestures, for enabling the processor and thus the device 11 to perform operations in accordance with each touch or touch gesture, including any related to operations or the like with respect providing broadcast based proximity services to the mobile device 11, as described herein.

The logic implemented by the processor of the mobile device 11, in the example, by the microprocessor 212, configures the processor to control various functions as implemented by the mobile device 11. The logic for a processor may be implemented in a variety of ways, but in our example, the processor logic is implemented by programming for execution by the microprocessor 212. The programming may take a variety of forms; and depending on the general program architecture, aspects relating to operations notifying the user of a received short message and providing a user interface allowing the user to reply to the received short message may be implemented in various ways. For example, the functions for notifying the user of a received short message and providing a user interface allowing the user to reply to the received short message could be implemented using a special module in the operating system and/or as a standalone application program.

The structure and operation of the mobile device 11 were described to by way of example, only.

A general-purpose computer, such as my be used to implement a server, typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the proximity service. The software code for at least some functions of the proximity service, for example, is executable by a general-purpose computer that functions as the application server 130, and/or the general-purpose computer that functions as the proximity service server 134. In operation, the code is stored within the respective general-purpose computer platform. At other times, however, the software may be stored at other locations and/or transported for loading into the appropriate general-purpose computer system. Execution of such code by a processor of the computer platform enables the platform to implement server functions of the methodology for providing the broadcast based proximity service, in essentially the manner performed in the implementations discussed and illustrated herein.

Figure 6:
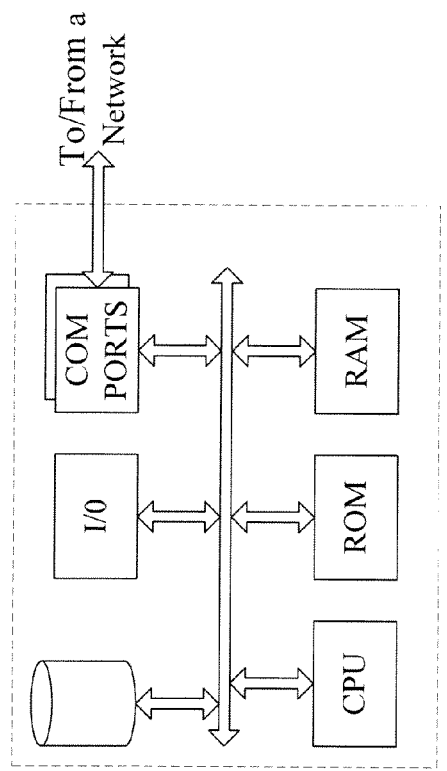
FIG. 6 is a simplified functional block diagram of a computer that may be configured as a host or server, for example, to function as the application server or any of the other servers of the system shown in FIG. 1.
Figure 7:
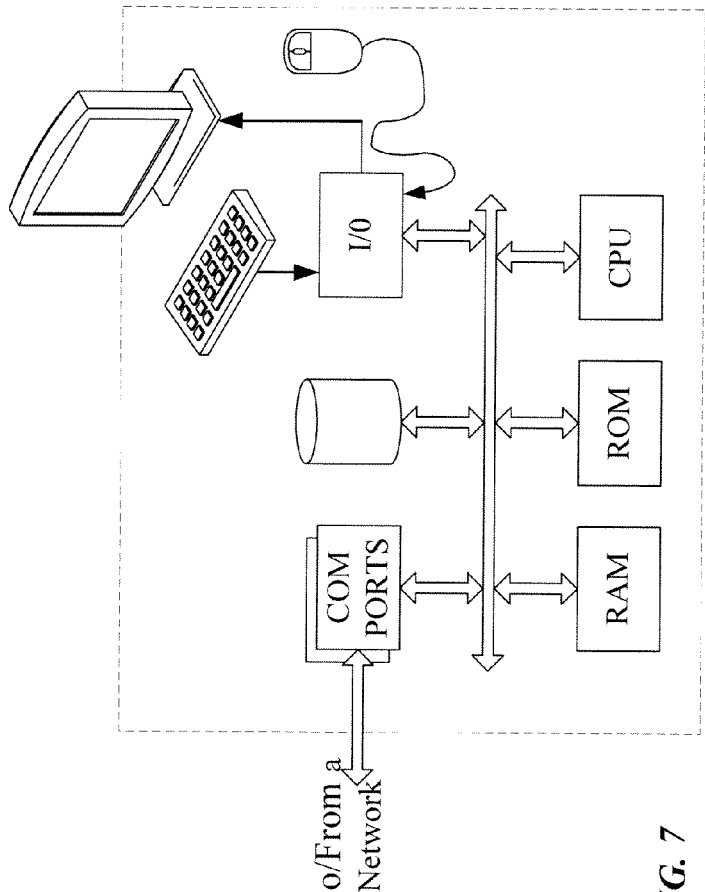
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

Hence, aspects of the methods of providing the broadcast based proximity service to mobile devices outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible non-transitory memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the proximity service provider into the computer platform of the proximity service server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement providing the proximity service to mobile devices, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
    based on a proximity service profile related to a proximity service selected from among a plurality of proximity services, transmitting a message offering service content indicated in the proximity service profile of the selected proximity service via a radio frequency transceiver of a cell of a mobile communication network, for reception by mobile devices when within a coverage area of the cell related to a geographical region identified in the proximity service profile, wherein the proximity service is provided by a proximity service provider;
    upon receiving a response to the broadcast message from one of the mobile devices indicating a request by a user of the one mobile device to receive further communication regarding the proximity service, obtaining, by an application server, the proximity service profile for the proximity service provider and a user profile for the user of the one mobile device from a profile database;
    determining whether the proximity service profile and the user profile each contain information indicating that the one mobile device and a proximity service server of the proximity service provider supports communicating directly via an alternate wireless network;
    in response to a determination that the one mobile device and the proximity service server of the proximity service provider supports communicating directly via an alternate wireless network, determining, by the application server, that the proximity service profile and the user profile are compatible so as to allow direct communication of the service content between the one mobile device of the user and a proximity service server of the proximity service provider; and
    transmitting the service content indicated in the proximity service profile of the proximity service to the one mobile device, wherein the service content is transmitted by either the mobile communication network or the alternate wireless network as determined according to the proximity service profile and the user profile related to the one mobile device.

2. The method of claim 1, wherein the service content identifies a location for receiving the provided proximity service by a user of the mobile device.

3. The method of claim 1, wherein the service content comprises at least one of an electronic promotional offer or multimedia content.

4. The method of claim 1, wherein:
    the proximity service profile comprises information on a geographic area in which to broadcast the message; and
    the step of transmitting comprises selecting the radio frequency transceiver of the cell from among radio frequency transceivers of a plurality of cells of the wireless mobile communication network, based on the coverage area of the cell including at least a portion of the geographic area.

5. The method of claim 1, wherein the message is configured to broadcast in a short messaging service message comprising a text message having a predetermined maximum message length.

6. The method of claim 1,
    wherein:
    the obtained user profile of the user of the one mobile device comprises user selected criteria for receiving service content as at least part of the provided proximity service;
    the proximity service profile comprises criteria for transmitting the service content to the one or more users of the proximity service; and
    the step of transmitting the service content identified in the proximity service profile is based at least in part upon a relationship between the user selected criteria of the obtained user profile and the criteria for transmitting the service content of the proximity service profile.

7. The method of claim 1, further comprising a step of the one mobile device filtering a plurality of messages broadcast from the radio frequency transceiver of the cell according to a user setting of the one mobile device, to select the message to prompt the users of the one mobile device to respond.

8. An application server configured to implement the method of claim 1, comprising:
a communication interface for coupling to the mobile communication network and a processor programmed to configure the application server to perform the steps.

9. An article for implementation of the method of claim 1, comprising a non-transitory machine readable medium and a program embodied in the medium for execution by a processor of the application server to configure the application server to perform the steps.

10. A method comprising steps of:
broadcasting, via a radio frequency transceiver of a cell of a mobile communication network by an application server coupled to the mobile communication network, a message prompting one of a plurality of mobile devices served by the cell of the mobile communication network to respond to an offer to receive service content of a proximity service offered by a proximity service provider to users of the mobile devices within a coverage area of the cell;
receiving, via the mobile communication network, in the application server, a user-initiated response to the message, from one mobile device of the plurality of mobile devices, wherein the user-initiated response requests receipt of the service content sent from the application server;
obtaining, by the application server, a proximity service profile for the proximity service provider and a user profile for the user of the one mobile device from a profile database;
determining, by the application server, whether the proximity service profile and the user profile are compatible by determining whether the proximity service profile and the user profile each contain information indicating that each of the mobile device and a proximity service server of the proximity service provider supports communicating directly via an alternate wireless network so as to allow direct communication of the service content between the one mobile device of the user and the proximity service server of the proximity service provider; and
upon determining that the proximity service profile and the user profile are compatible so as to allow the direct communication, sending, by the application server, instructions to the one mobile device via the mobile communication network and/or to the proximity service server connected via the alternate wireless network.

11. The method of claim 10, further comprising:
upon determining that the proximity service profile and a second user profile of a user of a second mobile device of the plurality of the mobile devices are not compatible so as to allow direct communication between the second mobile device and the proximity service server of the proximity service provider, transmitting the service content associated with the proximity service from the application server to the second mobile device via the mobile communication network.

12. The method of claim 10, wherein the alternate wireless network is a WiFi network or a Bluetooth network.

13. The method of claim 10, wherein the service content identifies a location for receiving the provided service by a user of the mobile device.

14. The method of claim 10, wherein the service content comprises at least one of an electronic promotional offer or multimedia content.

15. An application server configured to implement the method of claim 10, comprising:
a communication interface for coupling to the mobile communication network and a processor programmed to configure the application server to perform the steps.

16. An article for implementation of the method of claim 10, comprising a non-transitory machine readable medium and a program embodied in the medium for execution by a processor of the application server to configure the application server to perform the steps.

17. A mobile device, comprising:
a wireless transceiver configured to enable data communication for the device through a wireless mobile data communication network;
at least one user interface element configured to receive user input and provide audio and video output to the user;
a processor coupled to the wireless transceiver and the at least one user interface element configured to control functions of the mobile device, including functions to:
receive via the transceiver a message offering service content of a proximity service from a proximity service provider when the mobile device enters a coverage area of a cell of a mobile communication network;
present the received message via the at least one user interface element;
responsive to a user input indicating a request to receive the service content offered by the proximity service, transmit a response to the broadcast message indicating the request to receive the service content;
receive instructions from an application server based on a determination by the application server that a proximity service profile and a user profile each contain information indicating that each of the mobile device and a proximity service server of the proximity service provider supports communicating directly via an alternate wireless network, and are compatible so as to allow direct communication of the service content between the one mobile device of the user and the proximity service server of the proximity service provider via the alternate wireless network;
upon receiving instructions transmitted from the application server via the mobile communication network to enable direct communication between the mobile device and a proximity service server of a provider of the proximity service so as to offload transmission of service content from the mobile communication network, enable the direct communication; and
obtain the service content transmitted to the mobile device as at least part of the provided proximity service via the at least one user interface element.

18. The mobile device of claim 17, wherein the function to obtain the service content comprises a function to obtain the service content from an application server via the mobile communication network.

19. The mobile device of claim 17, further comprising:
another wireless transceiver configured to enable data communication for the device through the alternate wireless network, wherein the alternate wireless network is different from the wireless mobile data communication network,
wherein the processor is coupled to the wireless transceiver, the another wireless transceiver and the at least one user interface element, and configured to control functions of the mobile device, including functions to:

receive the service content indicated in the proximity service profile of the proximity service to the one mobile device via the another wireless transceiver.

\* \* \* \* \*